United States Patent
Hasegawa et al.

[11] Patent Number: 6,050,780
[45] Date of Patent: *Apr. 18, 2000

[54] METHOD FOR DRIVING A HIGH SPEED COMPRESSOR

[75] Inventors: Kazumitsu Hasegawa, Narashino; Shunichi Funabashi, Yokohama; Kanji Majima, Yokohama; Kiwamu Yamada, Yokohama; Shinichi Ozaki, Kunitachi, all of Japan

[73] Assignee: Ishikawajima-Harima Heavy Industries Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/732,037

[22] Filed: Oct. 16, 1996

[30] Foreign Application Priority Data

Oct. 25, 1995 [JP] Japan ................................ 7-277785

[51] Int. Cl.$^7$ .............................. F04B 49/06; F04B 35/04
[52] U.S. Cl. .......................... 417/44.11; 417/53; 417/45; 417/423.5; 417/423.6
[58] Field of Search ................................ 417/423.5, 426, 417/44.1, 44.11, 45, 321, 40.1, 53; 415/60, 65; 60/608; 318/801, 111

[56] References Cited

U.S. PATENT DOCUMENTS

| | | |
|---|---|---|
| 4,177,649 | 12/1979 | Venema . |
| 4,462,561 | 7/1984 | Cronin . |
| 4,532,458 | 7/1985 | Kuznetsov et al. ............ 318/111 |
| 4,686,834 | 8/1987 | Haley et al. . |
| 4,901,530 | 2/1990 | Kawamura .................... 60/608 |
| 5,019,757 | 5/1991 | Beifus . |
| 5,154,571 | 10/1992 | Prumper ........................ 415/60 |
| 5,382,132 | 1/1995 | Mendel ......................... 415/60 |
| 5,646,499 | 7/1997 | Doyama et al. ............... 318/801 |
| 5,795,138 | 8/1998 | Gozdawa ...................... 417/243 |

FOREIGN PATENT DOCUMENTS

| | | |
|---|---|---|
| 0 440 902 A1 | 8/1991 | European Pat. Off. . |
| 974 418 | 12/1960 | Germany . |
| WO 91/09230 | 6/1991 | WIPO . |

OTHER PUBLICATIONS

Patent Abstracts of Japan, vol. 8, No. 154 (M–310) [1591], Jul. 18, 1984 (JP 59 049394).

*Primary Examiner*—Charles G. Freay
*Attorney, Agent, or Firm*—McCormick, Paulding & Huber LLP

[57] ABSTRACT

A high speed compressor (10) includes a gear box (11), two compressing units (12, 13) supported on opposite side walls of the gear box (11) and a bull gear (32) rotatably placed in the gear box (11). Each compressing unit includes a scroll (15, 16) and an impeller (18, 19) rotatably housed in the scroll (15, 16). The impellers (18, 19) share an impeller shaft (22) extending into the gear box (11). A pinion gear (23) is mounted on the impeller shaft (22) such that it engages with the bull gear (32). A drive shaft (30) extends from the bull gear (32) out of the gear box (11) along a center axis of the gear box (11). An induction motor (35) is connected with the drive shaft (30) for causing the impellers (18, 19) to rotate by way of the bull gear (32) and the pinion gear (23). An inverter (40) is connected with the induction motor (35) at its one end and with a commercial power source (43) at the other end for converting an A.C. power from the commercial power source (43) into an A.C. power having a desired frequency and feeding it to the induction motor (35) for driving of the induction motor (35).

11 Claims, 3 Drawing Sheets

METHOD FOR DRIVING A HIGH SPEED COMPRESSOR

BACKGROUND OF THE INVENTION

1. Technical Field

The present invention relates to a turbo compressor which is rotated by an induction motor via a speed-up gear mechanism, and more particularly to a turbo compressor which is rotated at a high but mechanically safe speed and which can be operated independently of a frequency of a commercial power source applied to the induction motor.

2. Background Art

Generally a high speed compressor includes a plurality of scroll-and-impeller sets (or a plurality of compressing units) connected in series. Each scroll-and-impeller set or compressing unit includes a scroll and an impeller rotatably placed in the scroll. A high speed compressor including two compressing units is generally called a two-stage compressor. The air is introduced into a first compressing unit and compressed therein. The compressed air is then introduced to a second compressing unit. In this manner, the air is successively compressed through the in-series connected compressing units and ultimately discharged from the last compressing unit.

A high speed compressor also has a gear box and a bull gear rotatably provided in the gear box. The compressing units are generally mounted on an outer surface of the gear box. A drive shaft extends from the bull gear out of the gear box and is driven by an induction motor. The drive shaft is directly connected with the induction motor.

Each impeller has a shaft extending into the gear box and a pinion gear is mounted on a free end of the shaft. The pinion gears of the impellers mesh with the bull gear inside the gear box. It should be noted that a single pinion gear may mesh with the bull gear inside the gear box if only two compressing units are mounted on the gear box and the two impellers share a common shaft and a common pinion gear.

The bull gear is a large gear as compared with the pinion gears in diameter and number of teeth. The bull gear is connected with the induction motor via the drive shaft. Accordingly, the impellers are driven by the induction motor via the full gear and pinion gears.

In order to raise a rotational speed of the impellers, the large-diameter bull gear and the small-diameter pinion gears are, directly engaged with each other like a planetary gear set. This is a one-stage speed-up mechanism.

Conventionally, a commercial power source is used for actuation of the induction motor. A frequency of the commercial power source is generally different from country to country or from region to region. Therefore, the rotational speed of the induction motor also differs depending upon a place where the induction motor is used. For example, when a two-pole induction motor is driven in a 60 Hz region, a rotational speed meter reads 3,600 rpm whereas when it is driven in a 50 Hz region, the rotational speed meter indicates 3,000 rpm.

A speed-up ratio by the bull gear and each pinion gear is generally about twenty times since a gear ratio between the pinion gear and the bull gear is about 1/20. Therefore, a maximum speed of the impeller reaches about 60,000–72,000 rpm.

Consequently, performances of the high speed compressor vary with a frequency of an available commercial power source.

In the meantime, a compact high speed compressor has been desired in the art. In order to reduce dimensions of the high speed compressor without degrading its performances, it is necessary to rotate each impeller at a higher speed such as some 100,000 rpm.

To raise the impeller rotational speed, the speed-up ratio and/or the motor rotational speed should be increased. Employing a larger bull gear and/or smaller pinion gears results in an increased speed-up ratio. In addition, using a two-stage speed-up mechanism can also raise the impeller rotational speed.

However, it is practically impossible to raise a gear ratio between the bull gear and the pinion gear while employing a one-stage speed-up mechanism. This is because if there is substantial difference between the two gears in dimension, the gear diameter of the bull gear becomes too large with respect to its gear tooth height and width so that mechanically appropriate meshing cannot be expected between the bull gear and the pinion gears as long as these gears are manufactured with ordinary tolerance. It is generally said that the practically feasible maximum speed-up ratio (or reciprocal of the gear ratio) is thirty times.

If a two-stage speed-up structure is utilized, the speed-up ratio at each stage can be reduced. However, an intermediate gear is needed, so that the overall speed-up mechanism becomes complicated and larger. This is contrary to the above-mentioned object, i.e., size reduction of a high speed compressor.

The rotational speed of the motor is determined by a frequency of a commercial power source since the induction motor is used. Thus, the rotational speed of the motor cannot be raised.

Another concern is that a discharge pressure of the high speed compressor becomes higher than a designed value in winter since an air temperature becomes lower in winter and therefore an air density is higher in winter than in summer. Consequently, the motor should bear a greater load in winter. To avoid this, conventionally an inlet valve of the high speed compressor is throttled.

SUMMARY OF THE INVENTION

One object of the present invention is to provide a high speed compressor which can be rotated at a high rotational speed while ensuring a mechanically proper engagement between a bull gear and a pinion gear and which can exhibit predetermined performances regardless of a frequency of an available commercial power source.

According to one aspect of the present invention, there is provided a high speed compressor which comprises: a gear box; two compressing units supported on opposite lateral walls of the gear box, each compressing unit including a scroll and an impeller rotatably housed in the scroll, each impeller having an impeller shaft extending into the gear box and jointed with the other impeller shaft at its end such that the impellers share a common shaft; a pinion gear mounted on the common impeller shaft; a bull gear supported in the gear box and engaged with the pinion gear, a rotation center axis of the bull gear being coaxial to a center axis of the gear box; a drive shaft extending from the bull gear out of the gear box along the center axis of the gear box; an induction motor connected with the drive shaft for causing the impellers to rotate by way of the bull gear and the pinion gear; and an inverter connected with the induction motor at its one end and with a commercial power source at the other end for converting an A.C. power of the commercial power source into an A.C. power having a desired frequency and feeding it to the induction motor for actuation of the induction motor.

The gear ratio between the pinion gear and the bull gear may be about 1/10 to 1/30. The induction motor may be a two-pole motor. The inverter may have a rated output frequency of about 60 to 200 Hz. Each impeller may be rotated at 60,000 to 200,000 rpm so that the high speed compressor of the invention functions as a compact but high performance high speed compressor.

BRIEF DESCRIPTION OF THE ACCOMPANYING DRAWINGS

DETAILED DESCRIPTION OF THE PREFERRED EMBODIMENTS

Now, a preferred embodiment of the present invention will be described with reference to the accompanying drawings.

Figure 1:
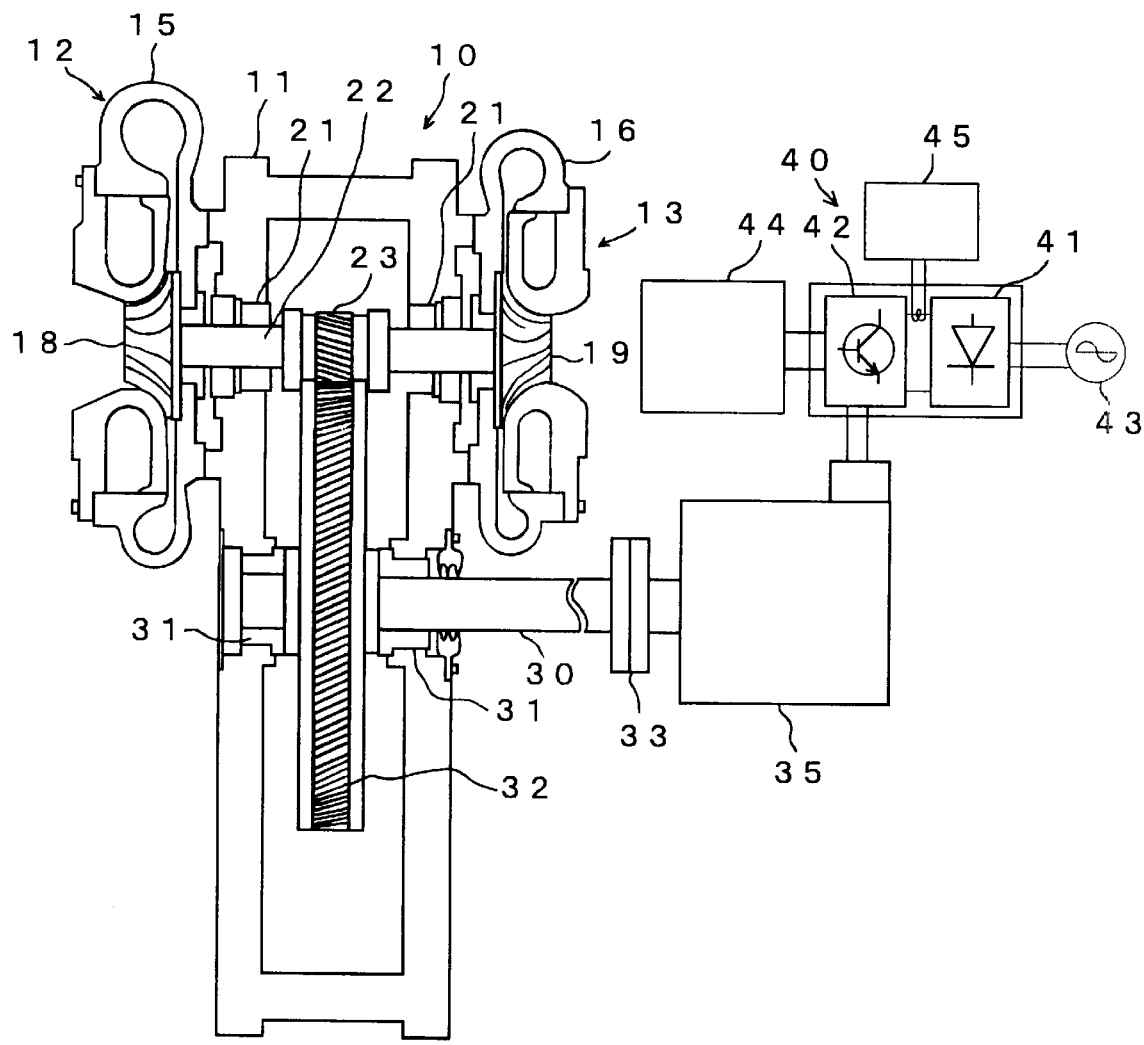
FIG. 1 illustrates a high speed compressor according to the present invention, shown partly in section and, without an intercooler and an aftercooler.

Referring to FIG. 1, a high speed compressor 10 is a two-stage-compression type compressor and includes two compressing units 12 and 13. The first compressing unit 12 and the second compressing unit 13 are symmetrically located on opposite side walls of a gear box 11 respectively near an upper end of the gear box 11.

The first compressing unit 12 includes a first scroll 15 attached to the upper left side wall of the gear box 11 and a first impeller 18 rotatably supported by the gear box 11 and rotatably housed in the first scroll 15. An external air is introduced into the first compressing unit 12 in an axial direction of the first impeller 18 (from the left in FIG. 1) and compressed by the first impeller 18 upon rotation of the first impeller 18 as a centrifugal force is applied to the air. Similarly, the second compressing unit 13 includes a second scroll 16 mounted on the upper right side wall of the gear box 11 and a second impeller 19 rotatably supported by the gear box 11 and rotatably housed in the second scroll 16. The compressed air from the first compressing unit 12 is introduced to the second compressing unit 13 and another centrifugal force is applied to the air by the second impeller 19 to further compress the air.

The first and second impellers 18 and 19 have a common shaft 22 or these two impellers are connected to each other by a first driven shaft 22. The first driven shaft 22 horizontally extends through an upper portion of the gear box 11 and is rotatably supported by a pair of bearings 21 fitted in openings formed in the opposite upper side walls of the gear box 11. A pinion gear 23 is provided on the first driven shaft 22 at its midpoint.

A drive shaft 30 horizontally extends through a center portion of the gear box 11 along a horizontal center axis of the gear box. A second pair of bearings 31 buried in opposite center walls of the gear box 11 support the drive shaft 30. The drive shaft 30 extends beyond the right second bearing 31 and out of the gear box 11. A bull gear 32 is provided on the drive shaft 30 inside the gear box 11. The bull gear 32 meshes with the pinion gear 23.

The bull gear 32 is a large-diameter gear having a large number of teeth. The pinion gear 23 is a small-diameter gear having a small number of teeth. A gear ratio between the large gear and the small gear is between 1/10 and 1/30.

A free end of the drive shaft 30 is connected to an induction motor 35 via a coupling 33.

The illustrated induction motor 35 is a two-pole induction motor. This motor 35 is driven by an inverter 40. The inverter 40 includes a rectifier element 41 having diodes and an inverter element 42 having transistors. A single- or three-phase commercial A.C. power source 43 of 60 or 50 Hz is converted to a D.C. power by the rectifier element 41 and undergoes a smoothing operation. The resulting D.C. power is on/off controlled by the transistors of the inverter element 42 to output a PWM (Pulse Width Modulated) wave and in turn an A.C. power having a desired frequency.

A frequency controller 44 is connected to the inverter 40 to control the output frequency of the inverter by switching on/off the transistors of the inverter element 42. A current detector 45 is also connected with the inverter 40 to detect a current flowing in the inverter 40.

The inverter 40 generates an A.C. power having a frequency of 60 to 200 Hz and supplies it to the induction motor 35. It should be noted that the inverter 40 can change the output frequency between 0 Hz and 120 Hz at intervals of, for example, 0.1 Hz.

The illustrated bull gear 32 and pinion gear 23 are smaller than conventional ones in diameter respectively. This is because the rotational speed of each of these gears is higher than a conventional design. By reducing the gear diameter, the peripheral speed of the gear is suppressed or maintained at an appropriate value and therefore a mechanical safety of the high speed compressor is ensured. If the peripheral speed is raised, the centrifugal force also becomes larger. The large centrifugal force may result in breakage of the gears 23 and 32 and/or other parts of the high speed compressor or malfunctioning of the high speed compressor 1.

In the illustrated embodiment, a load of the induction motor 35 is designed to be below 200 kW and a discharge pressure at the last compressing unit of the high speed compressor is designed to be 7 kg/cm$^2$.

Figure 2:
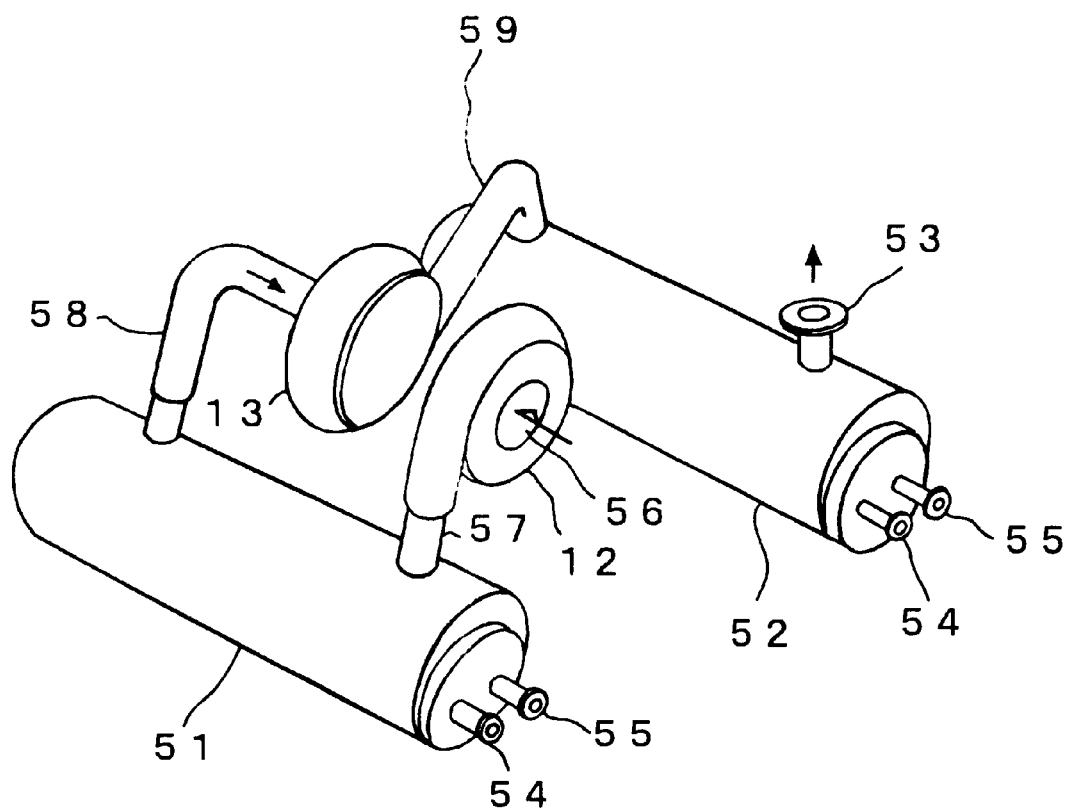
FIG. 2 illustrates a perspective view of two compressing units of the high speed compressor shown in FIG. 1, together with the intercooler and aftercooler but without a gear box.

Referring now to FIG. 2, it is understood that the high speed compressor of the invention is provided with a water-cooling-type air coolers (i.e., intercooler 51 and aftercooler 52).

Between the first compressing unit 12 and the second compressing unit 13, provided is an intercooler 51. An aftercooler 52 connects to an outlet of the second compressing unit 13 via a tube 59. Cooling water tubes 54 and 55 extend into and from each of the intercooler 51 and the aftercooler 52 so that the compressed air is indirectly cooled by the cooling water flowing through these water tubes.

An external air is sucked into the first compressing unit 12 from an air intake opening 56 and compressed therein. Upon compression, the air temperature rises. This compressed hot air is introduced to the intercooler 51 through a first outlet tube 57 and cooled therein. After that, the air is introduced into the second compressing unit 13 by an inlet tube 58 and compressed therein. The compressed air is then introduced to the aftercooler 52 by the second outlet tube 59 and cooled therein. The cooled and compressed air is ultimately supplied from an outlet tube 53 to a particular unit which needs the compressed air.

Now, operations of the high speed compressor will be described.

Referring back to FIG. 1, the inverter 40 outputs a two-phase A.C. power having a frequency of 60–200 Hz to the induction motor 35 using the frequency controller 44.

The induction motor 35 is a bipolar motor and rotates at a speed of 3,600–12,000 rpm. The bull gear 32 directly connected to the induction motor 35 also rotates at a high speed, i.e., 3,600–12,000 rpm. The gear ratio of the pinion gear 23 to the bull gear 32 is about 1/10–1/30. As a result, the speed of the impellers 18 and 19 connected to the pinion gear 23 is increased about 10–30 times and reaches about 60,000–200,000 rpm.

The inverter 40 inverts a commercial A.C. power to a D.C. power and converts it to an A.C. power having an desired frequency. Therefore, the high speed compressor of the invention is not influenced by the frequency of the commercial power source. Specifically, regardless of the commercial power source frequency being 50 or 60 Hz, the high speed compressor can use the same gears and the same motor.

Since the impellers 18 and 19 rotate at a very high speed such as 60,000 to 200,000 rpm and the diameters of the bull gear 32 and pinion gear 23 are reduced respectively as compared with the conventional ones, both size reduction and rotational speed increase are achieved.

The rated output frequency of the inverter 40 is 60 to 200 Hz. It should be noted, however, that its frequency is adjustable at intervals of predetermined Hz (e.g., 0.1 Hz) and therefore performances of the high speed compressor are also adjustable.

Figure 3:
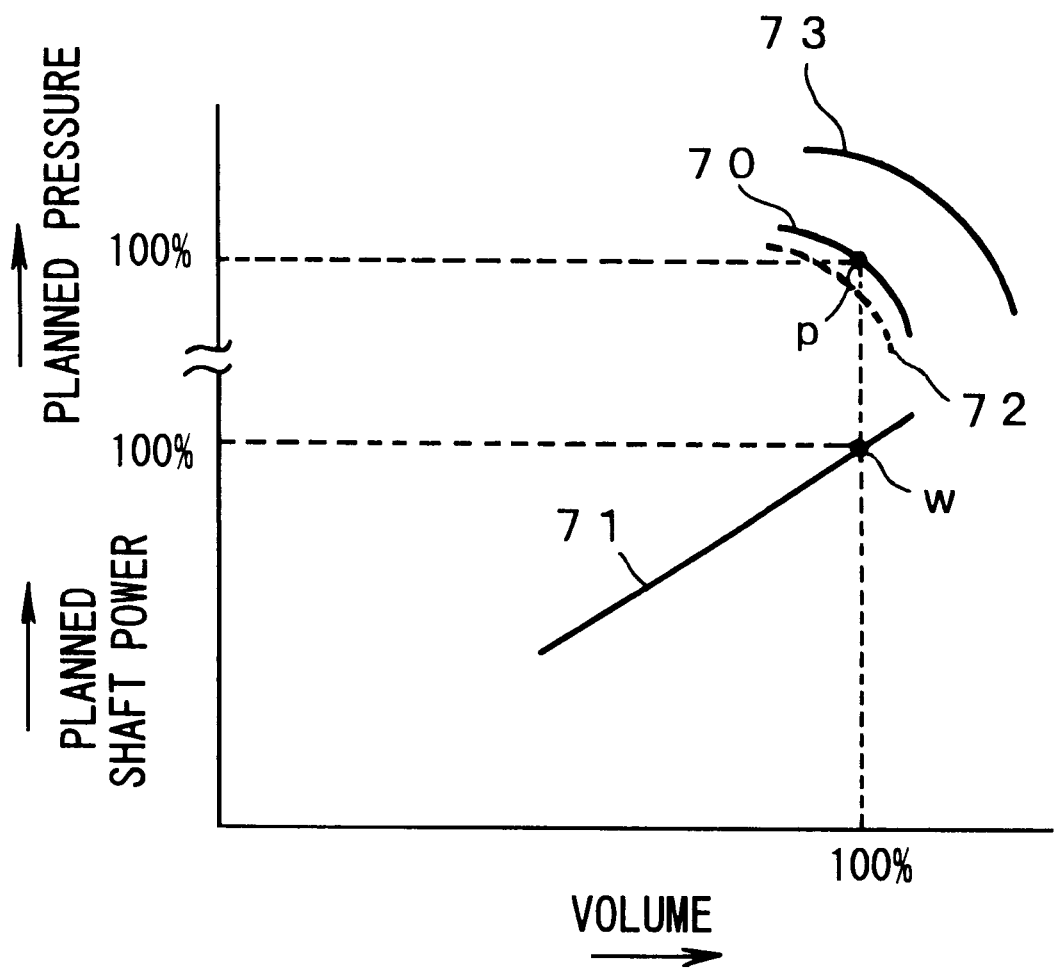
FIG. 3 is a graph illustrating characteristics of the high speed compressor shown in FIG. 1.

Referring to FIG. 3, illustrated is relationship between suction volume and planned (or designed) shaft power of the high speed compressor and that between suction volume and planned pressure increase.

In this embodiment, a planned pressure is 100% when discharge pressure is, for example, 7 kg/cm$^2$ and a planned flow rate (suction volume) at this discharge pressure is 100%. The point "p" represents a design point of when the discharge pressure is 100% and the suction volume is 100% with a condition that an inlet valve opening degree of the high speed compressor is 100%. The point "w" is a design point of when a shaft power under the same condition takes a 100% designed value. Then, the relationship between the volume and the pressure draws a characteristic curve 70 and the shaft power change draws a straight line 71.

The design point "p" is plotted under another condition that the intake air temperature is a designed value (e.g., 25° C.). If the atmospheric temperature rises to, for example, 35° C. in summer, the air density drops so that the characteristic curve 70 shifts downward as indicated by the dotted curve 72. If the atmospheric temperature drops to, for instance, 5° C. in, winter, the air density rises about 10% and accordingly the characteristic curve shifts upward as indicated by the curve 73.

Therefore, the load of the high speed compressor 1 varies with the intake air conditions. In particular, the discharge pressure is high in winter so that the high speed compressor 1 is operated under an excessive load condition.

To cope with this, the current detector 45 is used to detect the current of the inverter 40 for determination of the load of the induction motor 35. If the detected current is beyond a limit value, the frequency controller 44 causes the output frequency of the inverter 40 to drop. Upon this controlling operation by the controller 44, the rotational speed of the induction motor 35 is decelerated, the load on the induction motor 35 is lightened and the high speed compressor 1 is driven according to the characteristic curve 70 which passes through the design point "p", i.e., the volume (intake air flow rate) and the pressure of the high speed compressor take the most desirable values.

Conventionally, the rotational speed of the induction motor is fixed and not adjustable, and the load change due to the change of the intake air condition is coped with by adjusting the opening degree of the intake valve. In the present invention, on the other hand, the rotational speed of the induction motor itself is also adjustable so that the load change is coped with by the induction motor rotational speed adjustment and/or the intake valve opening degree adjustment.

Incidentally, the high speed compressor is usually operated by one of two control methods: one is a constant pressure and non surge control method in which a discharge pressure is maintained independently of volume change and the other is a load and no load control method in which the high speed compressor is turned on and off when the volume changes.

Conventionally, these control methods are carried out by adjusting the opening degree of the inlet valve. However, the valve opening degree control only adjusts the intake air flow rate: it does not control the performances or capability of the high speed compressor. Accordingly, a drive range in the volume/pressure graph is very limited. In the present invention, the frequency control is added to the conventional control (i.e., intake valve opening degree control) so that the drive range or control range in the volume/pressure graph is considerably broadened. Further, switching to the no load operation from the load operation can be done in an easier manner.

During the pressure-constant control, conventionally the opening degree of the inlet valve of the high speed compressor is adjusted in order to maintain the discharge pressure when the volume changes (or when consumed air flow rate changes). If the valve opening degree is adjusted, both the volume and pressure change. The inlet valve opening degree adjustment results in larger change in volume than in pressure. Contrarily, the frequency of the power source to the induction motor is adjusted by the inverter 40 in the present invention. The frequency adjustment can change the pressure without substantial change of the volume. Specifically, the pressure varies with square of rotational speed and the volume is proportional to the rotational speed so that larger change occurs in pressure than in volume. In the present invention, therefore, the inverter 40 is mainly utilized to keep the discharge pressure at a constant value when the volume change is small whereas the intake valve is mainly utilized when the volume change is large.

During the load condition of the non-load/load drive mode, the high speed compressor is operated according to the curve 70 of FIG. 3. During the non-load condition, the inlet valve is throttled to a 15% opening degree from a 100% opening degree until the discharge pressure approaches the atmospheric pressure and the shaft power of the high speed compressor drops to 10%. In this case, the rotational speed of the high speed compressor is also decelerated by the inverter 40 for smooth and easy shifting to the non-load condition from the load condition.

In the foregoing, the high speed compressor of a two-stage compression type is described. However, it should be noted that the present invention may be applied to a three-stage compression type and a four-stage compression type. Further, the illustrated induction motor is a two-pole motor, but it may be a motor having three poles or more.

What is claimed is:

1. A method for driving a high speed compressor from a commercial AC power source having a frequency of 60 Hz or less, the high speed compressor including a gear box having an outer surface and a center axis, a plurality of compressing units supported on the outer surface of the gear box, each compressing unit including a scroll and an impeller rotatably housed in the scroll, each impeller having an impeller shaft extending into the gear box, a bull gear placed in the gear box, a drive shaft extending from the bull gear out of the gear box along the center axis of the gear box, and a pinion gear drive between each impeller shaft including a pinion gear mounted on the impeller shaft and engaged with the bull gear, with a gear ratio between the pinion gear and the bull gear being about 1/10 to 1/30, said method comprising:

provide an induction motor drivingly connected with the drive shaft for causing the impellers to rotate by means of the bull gear and the pinion gear drive so that each impeller is rotatable at a predetermined maximum speed if the induction motor is directly powered from the commercial AC power source;

interposing an inverter between the induction motor and the commercial AC power source for converting the AC power from the commercial power source into an AC power having a desired frequency greater than 60 Hz and less than 200 Hz and feeding it to the induction motor for actuation of the induction motor, whereby each impeller is rotated at a speed greater than said predetermined maximum speed;

determining an excessive load on the induction motor by detecting a current flowing in the inverter; and providing a frequency controller for controlling an output frequency of the inverter, whereby the frequency converter causes the inverter to drop its output frequency when the current detected exceeds a predetermined current value.

2. The method of claim 1, wherein the plurality of compressing units are first and second compressing units, and the first and second compressing units are positioned on opposite sides of the gear box, connected with each other by a mutual impeller shaft, and share a common pinion gear provided on the mutual impeller shaft.

3. The method of claim 1, wherein each impeller is rotated at about 100,000 to 200,000 rpm.

4. The method of claim 1, wherein the induction motor is a two-pole induction motor.

5. The method of claim 1, wherein the inverter includes a rectifier unit for converting the commercial AC power to DC power and an inverter unit for converting the DC power to the AC power having a desired frequency greater than 60 Hz and less than 200 Hz.

6. The method of claim 1, further comprising the step of maintaining a discharge pressure of the high speed compressor at a predetermined discharge value.

7. The method of claim 6, wherein the discharge pressure of the high speed compressor is maintained at the predetermined discharge value by adjusting the output frequency of the inverter by means of the frequency controller.

8. The method of claim 6, wherein the pre-determined discharge value is about 7 kg/cm$^2$.

9. The method of claim 1, wherein each compressing unit produces compressed air, and further comprising the step of indirectly cooling the compressed air.

10. The method of claim 2, wherein each compressing unit produces compressed air, and further comprising the step of indirectly cooling the compressed air.

11. The method of claim 10, wherein the step of indirectly cooling the compressed air comprises providing intercooler means between the first compressing unit and the second compressing unit, and providing aftercooler means at an outlet of the second compressing unit.

* * * * *